US012621850B2

(12) United States Patent
Ye et al.

(10) Patent No.: US 12,621,850 B2
(45) Date of Patent: May 5, 2026

(54) SIDELINK TRANSMISSION COORDINATION

(71) Applicant: Apple Inc., Cupertino, CA (US)

(72) Inventors: Chunxuan Ye, San Diego, CA (US); Chunhai Yao, Beijing (CN); Dawei Zhang, Saratoga, CA (US); Haitong Sun, Cupertino, CA (US); Hong He, San Jose, CA (US); Huaning Niu, San Jose, CA (US); Seyed Ali Akbar Fakoorian, San Diego, CA (US); Sigen Ye, San Diego, CA (US); Wei Zeng, Saratoga, CA (US); Weidong Yang, San Diego, CA (US)

(73) Assignee: Apple Inc., Cupertino, CA (US)

( * ) Notice: Subject to any disclaimer, the term of this patent is extended or adjusted under 35 U.S.C. 154(b) by 749 days.

(21) Appl. No.: 17/906,116

(22) PCT Filed: Sep. 24, 2021

(86) PCT No.: PCT/CN2021/120484
§ 371 (c)(1),
(2) Date: Sep. 12, 2022

(87) PCT Pub. No.: WO2023/044820
PCT Pub. Date: Mar. 30, 2023

(65) Prior Publication Data
US 2024/0205943 A1 Jun. 20, 2024

(51) Int. Cl.
*H04W 72/40* (2023.01)
*H04W 72/02* (2009.01)
(Continued)

(52) U.S. Cl.
CPC .......... *H04W 72/40* (2023.01); *H04W 72/02* (2013.01); *H04W 72/542* (2023.01); *H04W 72/563* (2023.01)

(58) Field of Classification Search
CPC . H04W 72/40; H04W 72/542; H04W 72/563; H04W 72/02
See application file for complete search history.

(56) References Cited

U.S. PATENT DOCUMENTS

2022/0030575 A1* 1/2022 Farag .................... H04W 76/14
2022/0030612 A1* 1/2022 Balasubramanian ........................
H04L 5/0053
(Continued)

FOREIGN PATENT DOCUMENTS

CN 112291743 1/2021
CN 113285785 8/2021

OTHER PUBLICATIONS

Fraunhofer HHI et al., "Resource Allocation Enhancements for Mode 2", 3GPP TSG RAN WG1, Meeting #105-e, R1-2104561, May 11, 2021, 16 sheets.
(Continued)

*Primary Examiner* — Elton Williams
(74) *Attorney, Agent, or Firm* — Fay Kaplun & Marcin, LLP

(57) ABSTRACT

Embodiments of the present disclosure relate to sidelink transmission coordination. According to embodiments of the present disclosure, a processor of a user equipment (UE) configured to perform operations comprising: receiving, via a transceiver of the UE and from a second UE, coordination information concerning a transmission from the UE. The coordination information indicates a resource set preferred for the UE to perform resource selection. The operations further comprise determining at least one target resource for the transmission based on the resource set and at least one of the following: measured power of a signal associated with a resource in the resource set, reception time of the coordi-
(Continued)

nation information, and a reception scheduled for the UE on a resource in the resource set.

20 Claims, 10 Drawing Sheets

(51) Int. Cl.
    *H04W 72/542*         (2023.01)
    *H04W 72/563*         (2023.01)

(56) References Cited

U.S. PATENT DOCUMENTS

2024/0172185 A1*   5/2024   Hong .................... H04W 72/25
2024/0236958 A1*   7/2024   Guo ...................... H04W 72/40

OTHER PUBLICATIONS

Apple, "On Inter-UE Coordination", 3GPP TSG RAN WG1, Meeting#105-e, R1-2105127, May 12, 2021, 12 sheets.
Moderator, "FL summary for AI 8 11 1 2", 3GPP TSG RAN WG1, R1-2108569, Aug. 31, 2021, 257 sheets.
Huawei et al.: "Inter-UE coordination in sidelink resource allocation", 3GPP TSG RAN WG1 Meeting #106-e, R1-2106478, Aug. 7, 2021, 33 sheets.
LG Electronics: "Discussion on inter-UE coordination for Mode 2 enhancements", 3GPP TSG RAN WG1 Meeting #106-e, R1-2107529, Aug. 7, 2021, 31 sheets.

* cited by examiner

400

410

DETERMINE AT LEAST ONE RESOURCE SET FOR A SECOND UE

420

TRANSMIT, TO THE SECOND UE, COORDINATION INFORMATION INDICATING THE AT LEAST ONE RESOURCE SET

500

510

RECEIVE, FROM A SECOND UE, COORDINATION INFORMATION INDICATING A RESOURCE SET PREFERRED FOR THE UE

520

DETERMINE AT LEAST ONE TARGET RESOURCE FOR A TRANSMISSION FROM THE UE

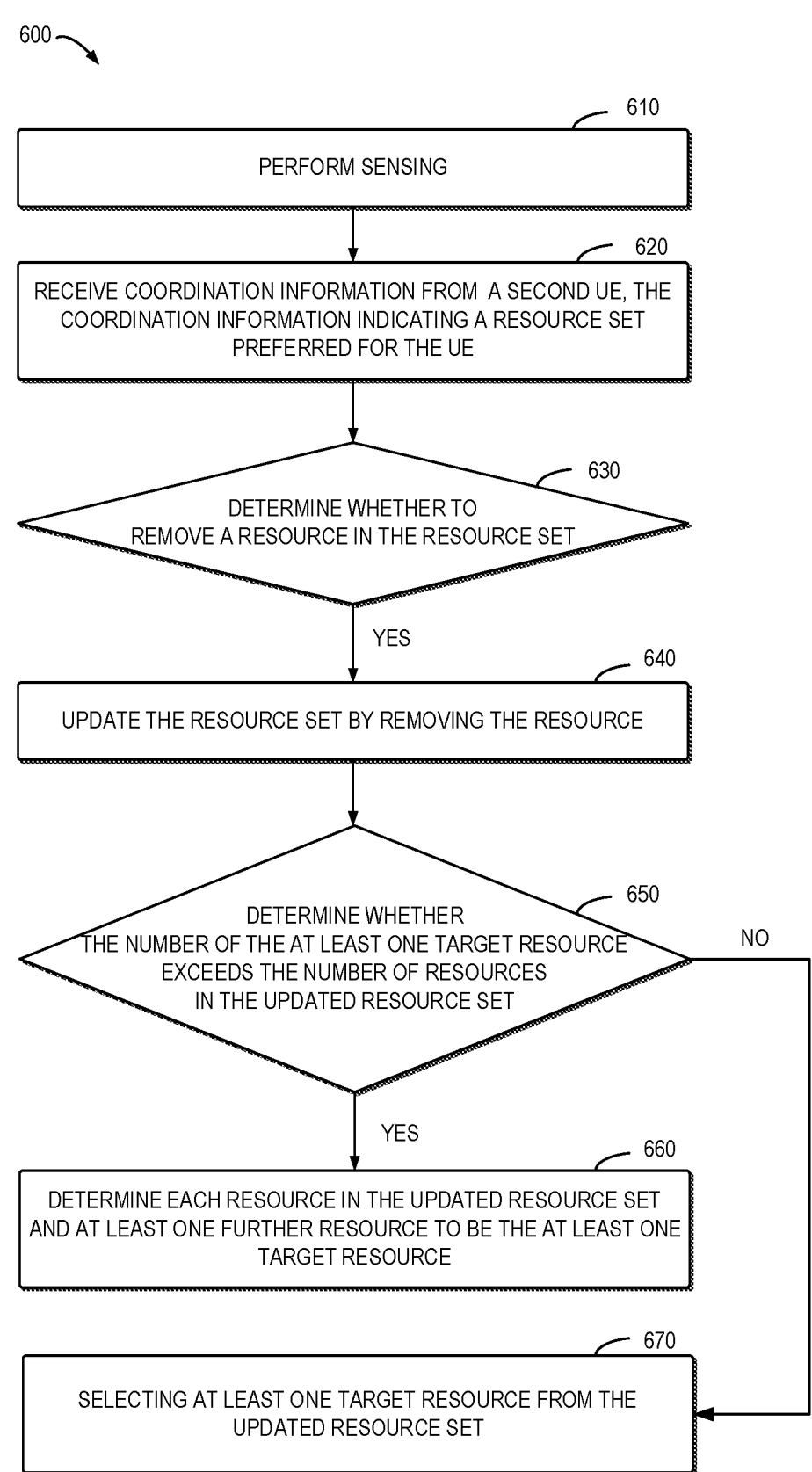

600

610

PERFORM SENSING

620

RECEIVE COORDINATION INFORMATION FROM A SECOND UE, THE COORDINATION INFORMATION INDICATING A RESOURCE SET PREFERRED FOR THE UE

630

DETERMINE WHETHER TO REMOVE A RESOURCE IN THE RESOURCE SET

YES

640

UPDATE THE RESOURCE SET BY REMOVING THE RESOURCE

650

DETERMINE WHETHER THE NUMBER OF THE AT LEAST ONE TARGET RESOURCE EXCEEDS THE NUMBER OF RESOURCES IN THE UPDATED RESOURCE SET

NO

YES

660

DETERMINE EACH RESOURCE IN THE UPDATED RESOURCE SET AND AT LEAST ONE FURTHER RESOURCE TO BE THE AT LEAST ONE TARGET RESOURCE

670

SELECTING AT LEAST ONE TARGET RESOURCE FROM THE UPDATED RESOURCE SET

RECEIVE, FROM A SECOND UE, CONTROL INFORMATION
INDICATING A RESOURCE RESERVED BY THE SECOND UE

720

DETERMINE A RESOURCE COLLISION STATUS OF THE SECOND UE
WITH A THIRD UE

730

TRANSMIT, TO THE SECOND UE, COORDINATION INFORMATION
INDICATING THE RESOURCE COLLISION STATUS

800

810

RECEIVE, FROM A SECOND UE, COORDINATION INFORMATION INDICATING A POTENTIALRESOURCE COLLISION OF THE UE WITH A THIRD UE

820

DETERMINE WHETHER TO RESELECT A RESOURCE BASED AT LEAST ON THE POTENTIAL RESOURCE COLLISION

YES

830

RESELECT A RESOURCE TO REPLACE A POTENTIALLY COLLIDED RESOURCE

900

SIDELINK TRANSMISSION COORDINATION

TECHNICAL FIELD

Embodiments of the present disclosure generally relate to the field of telecommunications, and in particular, to sidelink (SL) transmission coordination.

BACKGROUND

With the rapid development of the communication technology, communication systems can support various types of service applications for user equipment (UEs), such as transmissions between UEs. In recent communication technologies, it has been proposed to use SL connections for transmissions between UEs. Works are ongoing to introduce enhancements to SL transmissions, such as SL transmission coordination between UEs.

SUMMARY

In general, example embodiments of the present disclosure provide a solution for uplink multi-panel transmission.

In a first aspect, there is provided a processor of a UE. The processor is configured to perform operations comprising: receiving, via a transceiver of the UE and from a second UE, coordination information concerning a transmission to be performed by the UE, the coordination information indicating a resource set preferred for the UE to perform resource selection; and determining at least one target resource for the transmission based on the resource set and at least one of the following: measured power of a signal associated with a resource in the resource set, reception time of the coordination information, and a reception scheduled for the UE on a resource in the resource set.

In a second aspect, there is provided a processor of a UE. The processor is configured to perform operations comprising: determining whether at least one of the following conditions is met: that a configuration of the UE enables a transmission of coordination information to a second UE, that a channel status determined by the UE indicates a busy status, that a time gap associated with a potential resource collision exceeds a time threshold, that a priority associated with a potential resource collision exceeds a threshold priority; that a resource collision for the second UE is determined based on control information from the second UE, and that a distance between the UE and the second UE is above a threshold distance; and in accordance with a determination that the at least one of the conditions is met, transmitting, via a transceiver of the UE and to the second UE, the coordination information concerning a transmission to be performed by the second UE, the coordination information indicating the UE to perform resource selection.

In a third aspect, there is provided a processor of a UE. The processor is configured to perform operations comprising: determining at least one resource set for a second UE based on at least one of: measured power of a signal associated with a resource, control information from a third UE, and a priority of data to be transmitted using a resource reserved by the second UE; and transmitting, via a transceiver of the UE and to the second UE, coordination information concerning a transmission to be performed by the second UE, the coordination information indicating the at least one resource set.

In a fourth aspect, there is provided a processor of a UE. The processor is configured to perform operations comprising: receiving, via a transceiver of the UE and from a second UE, coordination information concerning a transmission to be performed by the UE, the coordination information indicating a potential resource collision of the UE with a third UE; and in accordance with the potential resource collision and a determination that at least one of the following conditions is met, reselecting a resource to replace a potentially collided resource: that a time gap between reception time of the coordination information and time of the potential resource collision exceeds a time threshold, that the UE performs partial sensing or no sensing, that the second UE is expected to receive data from the UE, that the potentially collided resource is used to transmit a data block different from a data block associated with control information of the UE, that the number of retransmissions of a data block to be transmitted using the potentially collided resource is above a threshold number, and that a delay limit for data transmission is smaller than a threshold.

In a fifth aspect, there is provided a processor of a UE. The processor is configured to perform operations comprising: receiving, via a transceiver of the UE and from a second UE, control information indicating a resource reserved by the second UE; determining a resource collision status of the second UE with a third UE based on at least one of the following: the control information from the second UE, further control information from the third UE, measured power of a signal from the second UE or further measured power of a signal from the third UE, and time of a potential resource collision; and transmitting, via the transceiver of the UE and to the second UE, coordination information concerning a transmission to be performed by the UE, the coordination information indicating the resource collision status.

In a sixth aspect, there is provided a UE. The user equipment comprises a transceiver and a processor. The processor is communicatively coupled to the transceiver and is according to any of the above first, second, third, fourth and fifth aspects It is to be understood that the summary section is not intended to identify key or essential features of embodiments of the present disclosure, nor is it intended to be used to limit the scope of the present disclosure. Other features of the present disclosure will become easily comprehensible through the following description.

BRIEF DESCRIPTION OF THE DRAWINGS

Through the more detailed description of some embodiments of the present disclosure in the accompanying drawings, the above and other objects, features and advantages of the present disclosure will become more apparent, wherein:

FIG. 6 illustrates a flowchart illustrating an example method of determining a target resource based on coordination information and a sensing result according to some embodiments of the present disclosure;

Throughout the drawings, the same or similar reference numerals represent the same or similar element.

DETAILED DESCRIPTION

Figure 1:
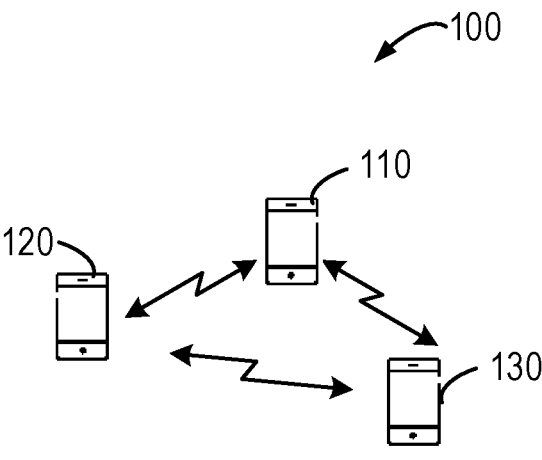
FIG. 1 shows an example communication network in which example embodiments of the present disclosure can be implemented.

Principle of the present disclosure will now be described with reference to some embodiments. It is to be understood that these embodiments are described only for the purpose of illustration and help those skilled in the art to understand and implement the present disclosure, without suggesting any limitation as to the scope of the disclosure. The disclosure described herein can be implemented in various manners other than the ones described below.

In the following description and claims, unless defined otherwise, all technical and scientific terms used herein have the same meaning as commonly understood by one of ordinary skills in the art to which this disclosure belongs.

The terminology used herein is for the purpose of describing particular embodiments only and is not intended to be limiting of example embodiments. For example, as used herein, the singular forms "a", "an" and "the" are intended to include the plural forms as well, unless the context clearly indicates otherwise. The terms "comprises", "comprising", "has", "having", "includes" and/or "including", when used herein, specify the presence of stated features, elements, and/or components etc., but do not preclude the presence or addition of one or more other features, elements, components and/or combinations thereof. Moreover, when a particular feature, structure, or characteristic is described in connection with some embodiments, it is submitted that it is within the knowledge of one skilled in the art to affect such feature, structure, or characteristic in connection with other embodiments whether or not explicitly described.

It is also to be understood that although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the listed terms.

As mentioned above, in recent communication technologies, it has been proposed to use SL connections for transmissions between UEs. In mode 2, resources for SL transmissions are coordinated between the UEs. For example, a UE may transmit inter-UE coordination (IUC) information to a further UE. The further UE may use the IUC information to perform resource selection for a following SL transmission. As used herein, the term of "SL transmission coordination" refers to SL transmission with the aid of IUC information transmitted between UEs. However, enhancements regarding the SL transmission coordination are desired, for example how to determine conditions to transmit the IUC information, how to determine a content in the IUC information and how to handle the IUC information received from another UE, etc.

Embodiments of the present disclosure propose a solution for SL transmission coordination enhancement. In this solution, a UE receives coordination information from a further UE. The coordination information concerns a transmission from the UE. The coordination information indicates a resource set preferred for the UE to perform resource selection. The UE determines at least one target resource for the transmission based on the resource set and at least one of the following conditions. The conditions comprises measured power of a signal associated with a resource in the resource set, reception time of the coordination information, and a reception scheduled for the UE on a resource in the resource set.

According to embodiments of the present disclosure, the UE can determine a target resource according to coordination information based on several conditions. By considering these conditions, the UE may select a resource not belonging to the preferred resource set indicated in the coordination information. In this way, it may avoid the UE from selecting a resource with a potential resource collision. Example Communication Network Principle and implementations of the present disclosure will be described in detail below with reference to FIGS. 1-9. FIG. 1 shows an example communication network 100 in which embodiments of the present disclosure can be implemented. The network 100 includes three UEs 110, 120 and 130. It is to be understood that the number of UEs as shown in FIG. 1 is only for the purpose of illustration without suggesting any limitations. The network 100 may include any suitable number of UEs adapted for implementing embodiments of the present disclosure. The network 100 may include additional devices, for example a base station.

In the communication network 100, the UEs 110, 120 and 130 can communicate data and control information with each other. Links between UEs 110, 120 and 130 are referred to as a SL. SL communications may support one or more communication methods including unicast communication, multicast communication, and broadcast communication. SL may comprise one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH).

In some example embodiments, a base station may perform SL resource allocation for the UEs 110, 120 and 130 (referred to as resource allocation mode 1 hereinafter). In some example embodiments, the UEs 110, 120 and 130 may perform autonomously resource selection (referred to as resource allocation mode 2 hereinafter). For example, the UE 110 may transmit IUC information to the UE 120 and/or the UE 130. The UE 120 and/or the UE 130 may receive the IUC information from the UE 110 and use the IUC information to perform resource selection and a following transmission. As used herein, the term "IUC information" may also be referred to as "coordination information". There are several types of procedures of SL transmission with coordination information, which will be described with reference to FIGS. 2A-2B.

SL Transmission with Coordination Information

Figure 2A:
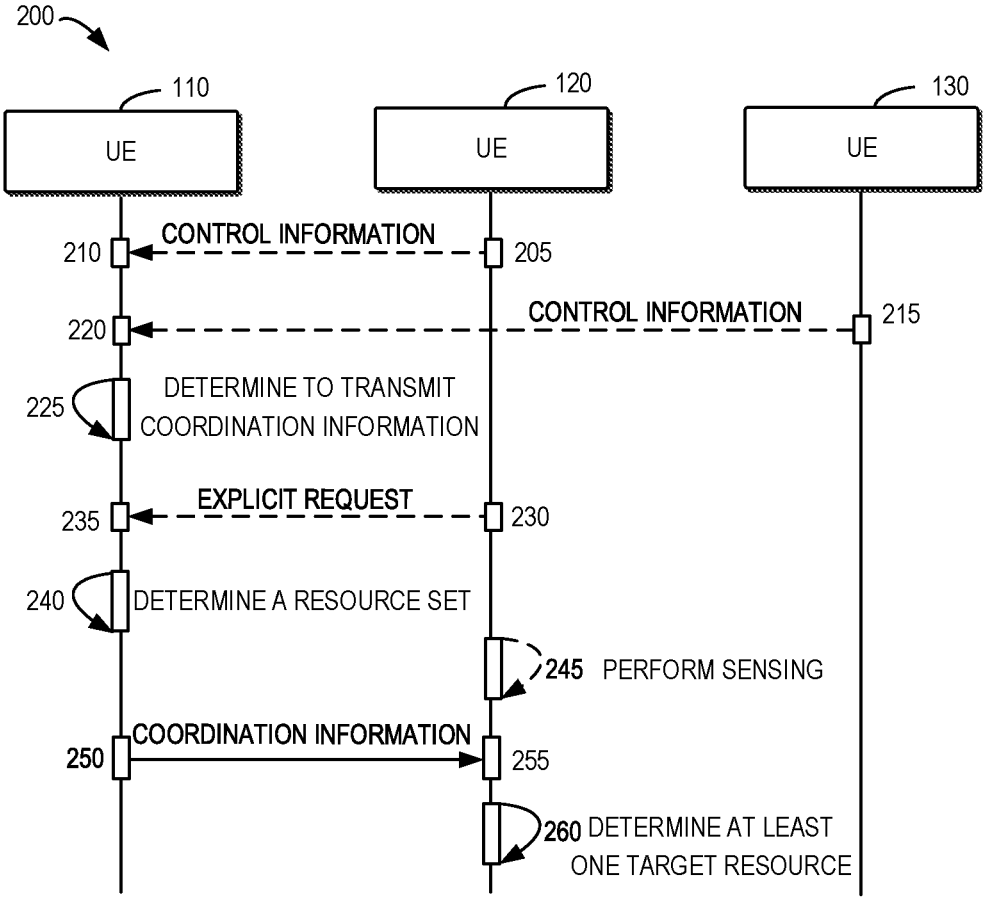
FIG. 2A illustrates a signaling flow for SL transmission with coordination information indicating a resource set according to some example embodiments of the present disclosure.

FIG. 2A illustrates a signaling flow 200 for SL transmission with coordination information indicating a resource set according to some example embodiments of the present disclosure. In the example embodiments with respect to FIG. 2A, the coordination information indicates a resource set for the UE 120 to perform resource selection, which is the case of scheme 1. As shown in FIG. 2A, the signaling flow 200 involves the UEs 110, 120 and 130 which perform SL communications. It is to be understood that although in FIG. 2A, the UE 110 transmits coordination information to the UE 120, in some example embodiments, the UE 110 may transmit coordination information to the UE 130, and also the UE 110 may receive coordination information from a further UE. As used herein, UE 110 (also referred to as UE-A) is the UE which will transmit coordination information to another UE. UE 120 (also referred to as UE-B) is the UE which will receive the coordination information from the UE 110.

For the purpose of discussion, there are three UEs illustrated in FIG. 2A. It is to be understood that the signaling flow 200 may involves more devices or less devices, and the number of devices illustrated in FIG. 2A is only for the purpose of illustration without suggesting any limitations.

In operations, the UEs 120 and 130 may transmit 205/215 control information, for example Sidelink Control Information (SCI) to the UE 110. The UE 110 may receive 210/220 the control information, for example the SCI via PSCCH or PSSCH from the UEs 120 and 130.

The UE 110 determines 225 whether to transmit coordination information to the UE 120. In some example embodiments, the UE 110 may make the determination based on for example a configuration of the UE 110. If the UE 110 determines 225 to transmit coordination information to the UE 120, the UE 110 may prepare to transmit coordination information to the UE 120. Details regarding determining 225 whether to transmit the coordination information will be described in details with respect to FIG. 3 below.

In addition or alternatively, the UE 120 may transmit 230, to the UE 110, an explicit request for coordination information. The UE 110 receives 235 the explicit request and may prepare to transmit coordination information to the UE 120.

As discussed above, if the UE 110 determines 225 to transmit the coordination information to the UE or the UE 110 receives 235 the explicit request for coordination information from the UE 120, the UE 110 may prepare to transmit coordination information. For example, the UE 110 determines 240 a resource set for the UE 120, for example a resource set preferred for the UE 120 or a resource set non-preferred for the UE 120. As used herein, the term "a resource set preferred for the UE 120" or "a preferred resource set for the UE 120" refers to a resource set in which each resource has not been reserved by a UE other than the UE 120. As used herein, the term "a resource set non-preferred for the UE 120" or "a non-preferred resource set for the UE 120" refers to a resource set in which each resource has been reserved by a UE other than the UE 120. Details regarding the determination 240 of a resource set for the UE 120 may be described with respect to FIG. 4 below.

With the determined resource set, the UE 110 transmits 250 coordination information to the UE 120. The coordination information indicates the determined resource set. The UE 120 receives 255 the coordination information from the UE 110.

The UE 120 determines 260 at least one target resource at least based on the coordination information received from the UE 110. The UE 120 may use the at least one target resource for a following SL transmission with the UE 110 or other UE(s). Details regarding determining 260 the target resource based on the coordination information will be described in details with respect to FIG. 5 below.

In some example embodiments, the UE 120 may perform 245 sensing for example during the SL communication procedure with other UE(s). For example, the UE 120 may receive SCI or other information from other UE(s) such as UE 110 and/or UE 130 or obtain other measurement result on a SL. Alternatively or in addition, the UE 120 may determines 260 the at least one target resource based on the received coordination information and further information obtained from sensing results of the UE 120. The UE 120 may perform a following SL transmission using the at least one target resource. Details regarding target resource determination 260 based on coordination information and sensing result will be described in details with respect to FIG. 6 below.

Procedures regarding SL transmission with coordination information indicating a resource set have been described with respect to FIG. 2A. From now on, details regarding several steps in the above procedures will be described with respect to FIGS. 3-6 below.

Figure 2B:
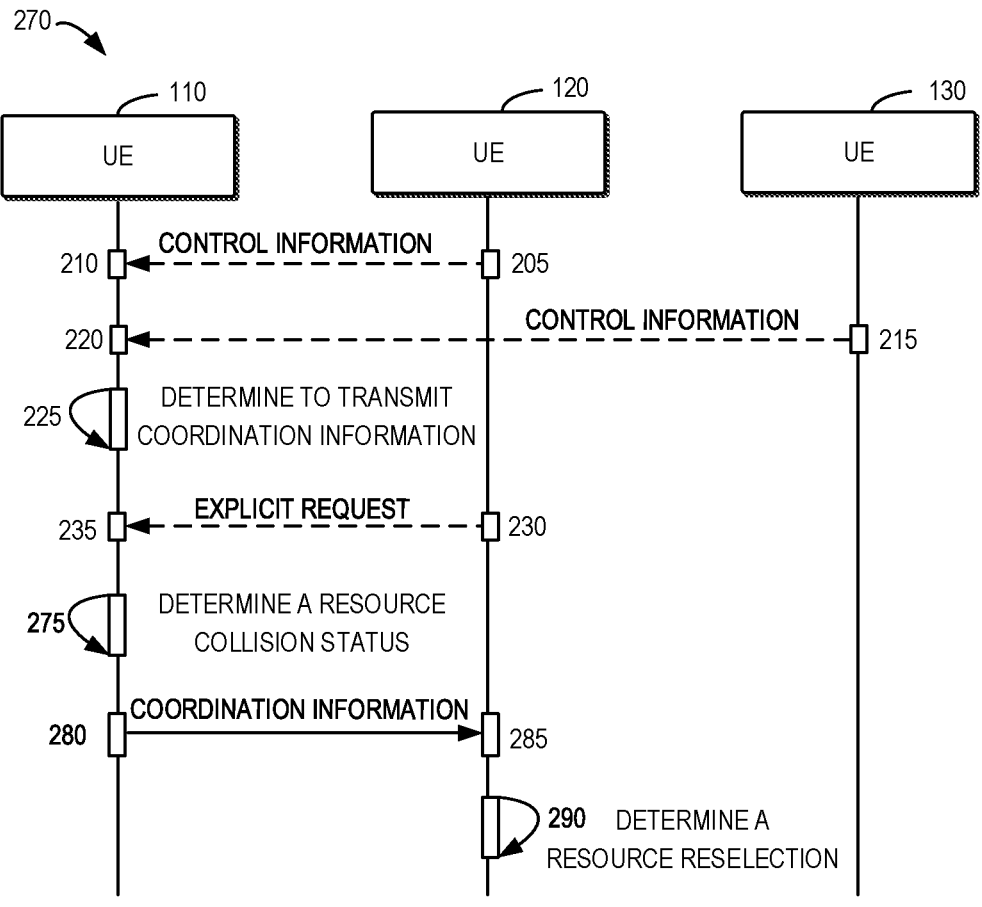
FIG. 2B illustrates a signaling flow for SL transmission with coordination information indicating a potential resource collision according to some example embodiments of the present disclosure.

FIG. 2A shows a general flow in the case of scheme 1. In some example embodiments, the coordination may indicate a potential resource collision, which is the case of scheme 2. FIG. 2B illustrates a signaling flow for SL transmission with coordination information indicating a potential resource collision according to some example embodiments of the present disclosure. In the example embodiments with respect to FIG. 2B, the coordination information indicates a potential resource collision for the UE.

As shown in FIG. 2B, the signaling flow 270 involves the UEs 110, 120 and 130 which perform SL communications. It is to be understood that although in FIG. 2B, the UE 110 transmits coordination information to the UE 120, in some example embodiments, the UE 110 may transmit coordination information to the UE 130, and also the UE 110 may receive coordination information from a further UE. As used herein, UE 110 (also referred to as UE-A) is the UE which will transmit coordination information to another UE. UE 120 (also referred to as UE-B) is the UE which will receive coordination information from the UE 110.

For the purpose of discussion, there are three UEs illustrated in FIG. 2B. It is to be understood that the signaling flow 270 may involves more devices or less devices, and the number of devices illustrated in FIG. 2B is only for the purpose of illustration without suggesting any limitations.

Acts with the same reference sign as FIG. 2A are the same and description thereof is not repeated here. As discussed above, if the UE 110 determines 225 to transmit the coordination information to the UE or the UE 110 receives 235 the explicit request for coordination information from the UE 120, the UE 110 may prepare to transmit coordination information. For example, the UE 110 determines 275 a resource collision status for the UE 120. That is, the UE 110 determines whether a potential resource collision is present for the UE 120. Details regarding determining 275 the resource collision status for the UE 120 may be described with respect to FIG. 7 below.

With the determined resource collision status, the UE 110 transmits 280 coordination information to the UE 120. The coordination information indicates the determined resource collision status. For example, the coordination information may indicate presence of a potential resource collision. The UE 120 receives 285 the coordination information from the UE 110.

If the coordination information received from the UE 110 indicating presence of the potential resource collision, the UE 120 determines 290 to reselect a resource to replace a potentially collided resource. The UE 120 may perform a following SL transmission using the reselected resource. Details regarding resource reselection based on the coordination information will be described in details with respect to FIG. 8 below.

General procedures regarding SL transmission with the coordination information in scheme 1 and scheme 2 have been described with respect to FIGS. 2A and 2B. From now on, details regarding several steps in the above procedures will be described with respect to FIGS. 3-8 below.

Conditions to Transmit Coordination Information

Conventionally, the UE-A may transmit coordination information to the UE-B in response to the explicit request, or otherwise makes a determination to transmit the coordination information to the UE-B. However, it lacks detail conditions regarding how to determine whether to transmit the coordination information or not.

Figure 3:
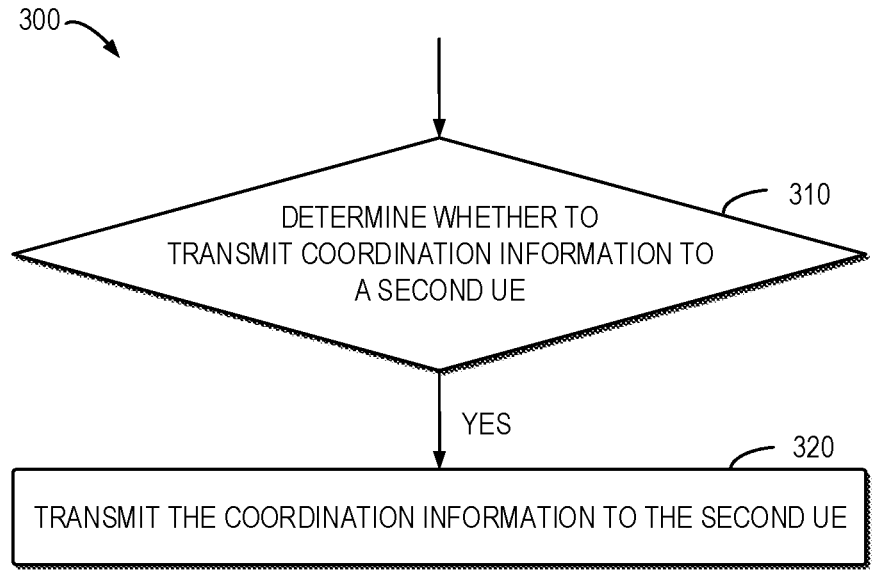
FIG. 3 illustrates a flowchart illustrating an example method of determination of coordination information transmission according to some embodiments of the present disclosure.

FIG. 3 illustrates a flowchart illustrating an example method 300 of determination of coordination information transmission according to some embodiments of the present disclosure. For the purpose of discussion, the method 300 will be described with reference to FIGS. 1, 2A and 2B. The method 300 may be implemented at a UE-A, for example, the UE 110. For the purpose of discussion, the method 300 will be described from the perspective of the UE 110.

At block 310, the UE 110 determines whether to transmit coordination information to the UE 120 based on at least one condition. The condition to transmit the coordination information may depend on the specific scheme. For example, different conditions may be applied for scheme 1 and scheme 2.

In scheme 1 as shown in FIG. 2A, a condition may be that a configuration of the UE 110 enables a transmission of the coordination information to the UE 120. For example, the UE 110 may be configured by higher layer to transmit the coordination information to the UE 120. If this condition is met, the UE 110 determines to transmit the coordination information to the UE 120.

In scheme 1, another condition may be that a channel status determined by the UE 110 indicates a busy status. For example, the UE 110 detects a channel busy ratio (CBR) higher than a threshold, which means that the channel is busy. A busier channel at higher CBR level will have more collision chances, which implies the need of the coordination information. In this situation, the condition is met, and then the UE 110 determines to transmit the coordination information to the UE 120.

In scheme 2 as shown in FIG. 2B, similar to scheme 1, a condition may be that a channel status determined by the UE 110 indicates a busy status. For example, the UE 110 detects a channel busy ratio (CBR) higher than a threshold, which means that the channel is busy. The threshold may be configured or preconfigured per resource pool. In this situation, the condition is met, and then the UE 110 determines to transmit the coordination information to the UE 120.

In scheme 2, another condition may be that a potential resource collision for the UE 120 is determined based on the control information from the UE 120. For example, the control information such as the SCI from the UE 120 indicates a need of the coordination information. In this situation, the UE 110 determines to transmit the coordination information to the UE 120.

Alternatively or in addition, in scheme 2, if the UE 110 determines that a time gap between reception time of the control information (such as the SCI from the UE 120) and time of the resource collision (such as time of a potentially collided resource) exceeds a time threshold, the UE 110 determines to transmit the coordination information to the UE 120.

In some example embodiments, in scheme 2, if the UE 110 determines that a priority of data indicated by the control information exceeds a threshold priority, the UE 110 determines to transmit the coordination information to the UE 120. The data is to be transmitted by a potentially collided resource. For example, if the UE 110 detects that the data priority of the potentially collided resource of the UE 120 is higher than a configured or (pre)configured threshold priority, the UE 110 determines to transmit the coordination information to the UE 120.

Alternatively or in addition, in scheme 2, if the UE 110 determines that a time gap between expected transmission time of the coordination information and time of the potential resource collision exceeds a time threshold, the UE 110 determines to transmit the coordination information to the UE 120.

In some example embodiments, in scheme 2, if the UE 110 determines that the resource collision is determined based on the control information from the UE 120 and further control information from UE 130, the UE 110 determines to transmit the coordination information to the UE 120. For example, if the control information from the UE 120 indicates that the UE 120 reserves a particular resource while the further control from the UE 130 indicates that the UE 130 reserves the particular resource as well, the UE 110 may determine a potential resource collision on the particular resource.

In some example embodiments, in scheme 2, if the UE 110 determines that a distance between the UE 110 and the UE 120 is less than a threshold distance, the UE 110 may determine a potential resource collision on the particular resource. For example, in groupcast feedback option 1, the SCI stage 2 of the UE 120 has zone ID. The UE 110 may calculate the distance between the UE 110 and the UE 120 based on the zone ID comprised in the SCI received from the UE 120.

If at block 310, the UE 110 determines to transmit the coordination information to the UE 120, the method 300 will proceed to the block 320. At block 320, the UE 110 transmits, via a transceiver of the UE 110, the coordination information to the UE 120. The coordination information concerns a transmission to be performed by the UE 120. The coordination information indicates the UE 120 to perform resource selection. For example, the UE 120 may perform the resource selection based on the coordination information to select a resource for the transmission to be performed by the UE 120. In some embodiments, for example in the case of scheme 1, the coordination information may indicate a resource set non-preferred for the UE 120 without a resource set preferred for the UE 120. Alternatively, in some examples in the case of scheme 2, the coordination information may indicate a potential resource collision for the UE 120.

The above mentioned conditions may help the UE 110 to determine whether to transmit the coordination information to the UE 120. In this way, the UE 110 may transmit the coordination information without the explicit request from the UE 120. For example, a UE-A, for example a road-side unit which has powerful sensing ability, can transmit the coordination information based on its sensing results to help one or more neighbor UEs (for example, a UE-B such as the UE 120 or the UE 130) to enhance their resource selection reliability. Using the above described determination of transmission of the coordination information, the SL transmission will be enhanced.

Determination of a Resource Set

As mentioned above, in scheme 1, the UE 110 determines 240 a resource set for the UE 120. The resource set may be indicated in the coordination information. Conventionally, if the UE-A identifies that Reference Signal Received Power (RSRP) of resources excluding those overlapping with reserved resource(s) of other UE(s) exceeds a RSRP threshold, and the UE-A identifies additional conditions for example a condition that the resource(s) satisfies the UE-B's requirement, the UE-A may determine those resource(s) satisfying those conditions as a preferred resource for the UE-B. In addition, the UE-A may determine a non-preferred resource for the UE-B under other conditions regarding the RSRP. However, further conditions regarding how to determine a preferred or non-preferred resource set for the UE-B still needs improvement.

Figure 4:
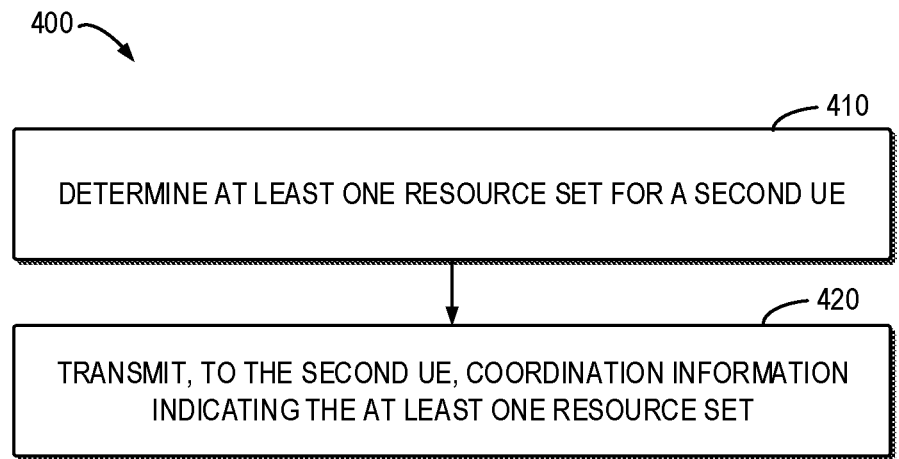
FIG. 4 illustrates a flowchart illustrating an example method of determining a resource set to be indicated by coordination information according to some embodiments of the present disclosure.

FIG. 4 illustrates a flowchart illustrating an example method 400 of determining a resource set to be indicated by coordination information according to some embodiments of the present disclosure. For the purpose of discussion, the method 400 will be described with reference to FIGS. 1 and 2A. The method 400 may be implemented at a UE-A, for example, the UE 110. For the purpose of discussion, the method 400 will be described from the perspective of the UE 110.

At block 410, the UE 110 determines at least one resource set for the UE 120 based on at least one of: measured power of a signal associated with on a resource, control information from the UE 130, and a priority of data to be transmitted using a resource reserved by the UE 120.

The measured power is on a resource whose reservation is on a candidate resource in the resource set. For example, the candidate resource in the resource set is on slot n. If the UE 120 receives a signal on slot m (m<n) whose measured power (RSRP) is high, and whose resource reservation is for the resource on slot n. When the UE 120 performs resource selection, the UE 120 may determine that the candidate resource on the slot n is not usable any more.

The measured power may be RSRP. For example, if the RSRP associated with the resource is below a first threshold, the UE 110 may add the resource into a first resource set preferred for the UE 120. Alternatively or in addition, if the RSRP associated with the resource exceeds a second threshold, the UE 110 may add the resource into a second resource set non-preferred for the UE 120.

It is to be understood that the first threshold and the second threshold may be configured or preconfigured by a resource pool or based on PC5-Radio Resource Control (RRC) configuration. The first threshold and the second threshold may be the same or different.

In some example embodiments, if the UE 110 determines that a further resource is not reserved based on the control information from the UE 130, the UE 110 may add the further resource into the first resource set preferred for the UE 120. For example, the UE 110 may perform sensing and not detect SCI from a UE other than the UE 120, for example the SCI from the UE 130, reserving the further resource, the UE 110 may add the further resource into the first resource set preferred for the UE 120.

In some example embodiments, if the UE 110 determines that the measured power of the signal associated with the resource exceeds a third threshold, the UE 110 may add the resource into the second resource set non-preferred for the UE 120. The third threshold is determined based on a priority of data to be transmitted using the resource and a configured or preconfigured data priority level. The data priority level may be configured or preconfigured by a resource pool or based on PC5-RRC configuration. The data priority level for preferred resource set and for non-preferred resource set may be different.

At block 420, the UE 110 transmits, via a transceiver of the UE 110 and to the UE 120, the coordination information concerning a transmission to be performed by the UE 120. The coordination information indicates the at least one resource set. For example, the coordination information may indicate a resource set preferred for the UE 120 such as the first resource set or a resource set non-preferred for the UE 120 such as the second resource set as determined by procedures discussed above. The UE 120 may perform resource selection based on the coordination information to select a resource for the transmission performed by the UE 120.

The above mentioned procedures may help the UE 110 to determine a preferred or non-preferred resource set for the UE 120. In this way, the UE 120 may easier determine a target resource based on the coordination information indicative of a resource set determined by the UE 110. Using the above described determination of a resource set for the UE 120, the SL transmission will be enhanced. The determination of a target resource by the UE 120 may be described with respect to FIG. 5 below.

Determination of a Target Resource

Conventionally, the UE-B may determine a target resource based on the coordination information received from the UE-A and the sensing result of the UE-B (if available). However, it lacks detail conditions and methods regarding how to determine the target resource for the UE-B.

Figure 5:
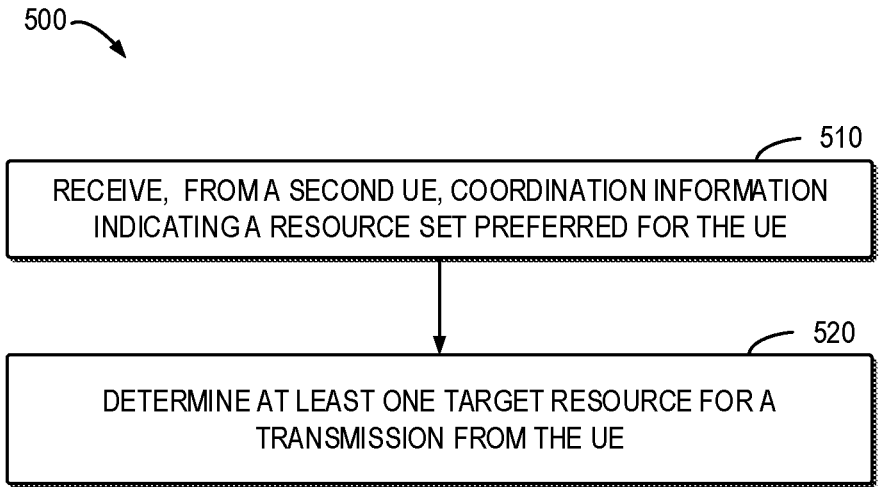
FIG. 5 illustrates a flowchart illustrating an example method of determining a target resource based on coordination information according to some embodiments of the present disclosure.

FIG. 5 illustrates a flowchart illustrating an example method 500 of target resource determination based on coordination information according to some embodiments of the present disclosure. For the purpose of discussion, the method 500 will be described with reference to FIGS. 1 and 2A. The method 500 may be implemented at a UE-B, for example, the UE 120. For the purpose of discussion, the method 500 will be described from the perspective of the UE 120.

At block 510, the UE 120 receives, via a transceiver of the UE 120 and from the UE 110, coordination information concerning a transmission to be performed by the UE 120. The coordination information indicates a resource set preferred for the UE 120 to perform resource selection.

At block 520, the UE 120 determines at least one target resource for the transmission based on the coordination information and additional information. For example, the UE 120 determines the at least one target resource based on the resource set indicated by the coordination information and at least one additional information. Examples of the additional information may include but not limited to: measured power of a signal associated with a resource in the resource set, reception time of the coordination information, and a reception scheduled for the UE 120 on a resource in the resource set.

In some example embodiments, the UE 120 may receive, from a further UE-A (for example a further UE-A in the communication network 100), further coordination information indicating a further resource set preferred for the UE 120 to perform resource selection. The at least one target resource is determined further based on the further resource set. For example, if the UE 120 receives multiple resource sets preferred for the UE 120 from multiple UE-As, the final resource set preferred for the UE 120 may be a union or an inter-section of these resource sets.

In some example embodiments, if the UE 120 determines that a time gap between the reception time of the coordination information and a delay limit for the transmission is less than a time threshold, the UE 120 may perform random resource selection to select the at least one target resource. For example, if the coordination information is received close or after data packet delay budget (PDB), or the time gap between the reception time of the coordination information and the data PDB is less than a time threshold, the UE 120 may perform random resource selection or not rely on the coordination information for its resource selection. It is to be understood that the time threshold may be configured or preconfigured.

In some example embodiments, the UE 120 may perform sensing. In this situation, the UE 120 may determine the at least one target resource based on the coordination information and the sensing result. For example, if the UE 120 determines that measured power of a signal associated with a resource in the resource set exceeds a power threshold, the UE 120 may select a further resource exclusive of the resource set to be one of the at least one target resource.

For example, if the RSRP measurement at the UE 120 corresponding to the resource in the resource set preferred for the UE 120 exceeds a RSRP threshold, the UE 120 may perform resource selection based on its sensing result to select a further resource exclusive of the resource set to be one of the at least one target resource. In some example embodiments, the RSRP threshold is determined based on a priority of data to be transmitted using the resource in the resource set. Alternatively, in some example embodiments, the RSRP threshold is configured or preconfigured by a resource pool.

In some example embodiments, in the situation that the UE 120 performs sensing, if the UE 120 determines that time of a resource in the resource set is to be used for the reception scheduled for the UE 120, the UE 120 may select a further resource exclusive of the resource set to be one of the at least one target resource. In this way, the UE 120 may not select the resource to be used for the reception scheduled for the UE 120, thus will prevent the UE 120 from SL transmission due to half duplex.

In some example embodiments, in the situation that the UE 120 performs no sensing, the UE 120 may determine the at least one target resource based on the coordination information. For example, if the UE 120 determines that the number of the at least one target resource is less than the number of resources in the preferred resource set indicated by the coordination information, the UE 120 may randomly select the at least one target resource from the preferred resource set. If the UE 120 determines that the number of the at least one target resource exceeds the number of resources in the preferred resource set, the UE 120 may determine each resource in the preferred resource set and at least one further resource to be the at least one target resource. The at least one further resource is exclusive of the resource set. For example, the UE 120 may randomly select the at least one further resource.

Several example embodiments regarding determination of the at least one target resource have been described above, a further embodiment will be described with respect to FIG. 6 below. FIG. 6 illustrates a flowchart illustrating an example method 600 of target resource determination based on coordination information and sensing result according to some embodiments of the present disclosure. For the purpose of discussion, the method 600 will be described with reference to FIGS. 1 and 2A. The method 600 may be implemented at a UE-B, for example, the UE 120. For the purpose of discussion, the method 600 will be described from the perspective of the UE 120.

At block 610, the UE 120 performs sensing. At block 620, the UE 120 receives, from the UE 110, coordination information concerning a transmission to be performed by the UE 120. The coordination information indicates a resource set preferred for the UE 120 to perform resource selection. The UE 120 may select a resource for the transmission based on the coordination information.

At block 630, the UE 120 determines whether to remove a resource in the resource set based on the at least one of the measured power, the reception time and the reception scheduled for the UE. The determination process is similar to the determination described with respect to FIG. 5. If at block 630, the UE determines to remove the resource in the resource set, the method 600 will proceed to block 640.

At block 640, the UE 120 updates the resource set by removing the resource. At block 650, the UE 120 determines whether the number of the at least one target resource is less than the number of resources in the updated resource set. If at block 650, the UE 120 determines that the number of the at least one target resource is less than the number of resources in the updated resource set, then the method 600 will proceed to block 660. At block 660, the UE 120 may select the at least one target resource from the updated resource set.

If at block 650, the UE 120 determines that the number of the at least one target resource exceeds the number of resources in the updated resource set, then the method 600 will proceed to block 670. At block 670, the UE 120 may determine each resource in the updated resource set and at least one further resource to be the at least one target resource. The at least one further resource is exclusive of the updated resource set. For example, the UE 120 may select the at least one further resource based on its sensing result, such as via a legacy resource selection procedure.

By determining the at least one target resource based on the coordination information and additional further information, it may avoid the UE 120 from selecting a potentially collided resource. In addition, it may avoid the SL transmission due to half duplex. Using the above described determination of target resource, the SL transmission will be enhanced.

Determination of a Resource Collision Status

As mentioned above, in scheme 2, if the UE 110 determines to transmit the coordination information to the UE 120, or receives an explicit request for the coordination information from the UE 120, the UE 110 may determine 275 the resource collision status for the UE 120.

Conventionally, if the UE-A identifies that an expected or potential resource collision occurs on the resource(s) satisfying at least one condition, the UE-A may determine presence of the expected or potential resource collision. The at least one condition comprises for example that other UE(s) reserves reserved resource(s) are fully or partially overlapping with resource(s) indicated by SCI of a UE-B.

However, it still needs to specify additional criteria and details including signaling regarding the indication of a potential resource collision.

Figure 7:
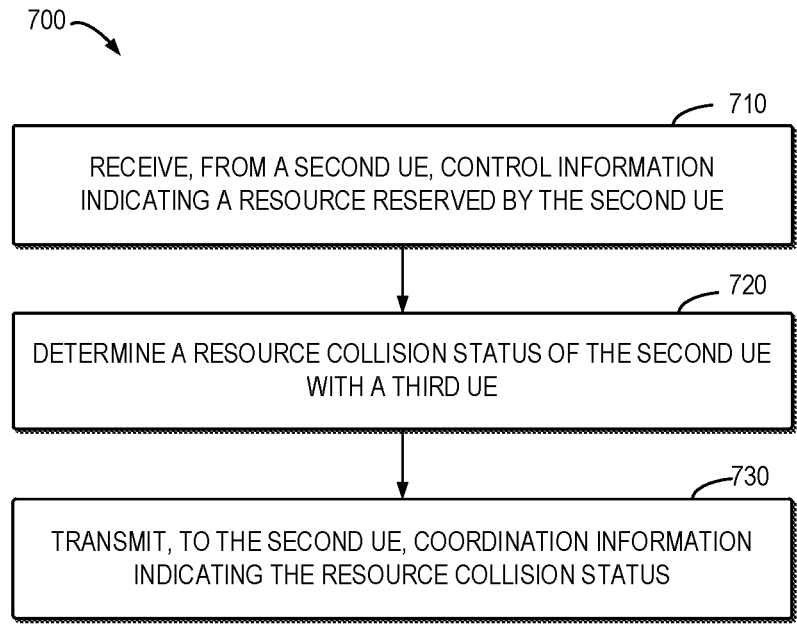
FIG. 7 illustrates a flowchart illustrating an example method of determining a potential resource collision according to some embodiments of the present disclosure.

FIG. 7 illustrates a flowchart illustrating an example method 700 of determination of a potential resource collision indicated by coordination information according to some embodiments of the present disclosure. For the purpose of discussion, the method 700 will be described with reference to FIGS. 1 and 2B. The method 700 may be implemented at a UE-A, for example, the UE 110. For the purpose of discussion, the method 700 will be described from the perspective of the UE 110.

At block 710, the UE 110 receives, via a transceiver of the UE 110 and from the UE 120, control information indicating a resource reserved by the UE 120. For example, the UE 110 may receive SCI from the UE 120. At block 720, the UE 110 determines 720 a resource collision status of the UE 120 with a further UE such as the UE 130. For example, the UE 110 determines the resource collision status based on at least further information. Examples of further information may include but not limited to: the control information from the UE 120, further control information from the UE 130, measured power of a signal from the UE 120 or further measured power of a signal from the UE 130, and time of the potential resource collision.

For example, the UE 110 may perform sensing and receive the control information from the UE 120 and the further control information from the UE 130. If the control information from the UE 120 and the further control information from the UE 130 indicate that both the UE 120 and the UE 130 reserve a same resource, the UE 110 may determine that a potentially collided resource is reserved by both the UE 120 and the UE 130. The UE 110 may also determine the potentially collided resource based on other conditions.

In some example embodiments, if the UE 110 determines that the potentially collided resource is reserved by both the UE 120 and the UE 130 and that a priority of data to be transmitted using the potentially collided resource by the UE 120 exceeds a threshold priority, the UE 110 may determine the resource collision status as presence of a potential resource collision. The priority of data is indicated by the control information from the UE 120, for example the SCI from the UE 120. The threshold priority is configured or preconfigured.

Alternatively or in addition, if the UE 110 determines that a potentially collided resource is reserved by both the UE 120 and the UE 130 and that a priority of data to be transmitted using the potentially collided resource by the UE 130 exceeds a threshold priority, the UE 110 may determine the resource collision status as presence of a potential resource collision. The priority of data is indicated by the further control information from the UE 130, for example the SCI from the UE 130. The threshold priority is configured or preconfigured.

In some example embodiments, if the UE 110 determines that a resource is reserved by both the UE 120 and the UE 130 and that a distance between the UE 120 and the UE 110 is less than a threshold distance, the UE 110 may determine the resource collision status as presence of a potential resource collision. The distance is determined based on the control information from the UE 120. For example, the UE 110 may calculate the distance based on the SCI using groupcast feedback option 1 (i.e., negative acknowledgement (NACK) only scheme) from the UE 120. The threshold distance is configured or preconfigured.

Alternatively or in addition, if the UE 110 determines that a resource is reserved by both the UE 120 and the UE 130 and that a distance between the UE 130 and the UE 110 is less than a threshold distance, the UE 110 may determine the resource collision status as presence of a potential resource collision. The distance is determined based on the further control information from the UE 130. For example, the UE 110 may calculate the distance based on the SCI using groupcast feedback option 1 (i.e., negative acknowledgement (NACK) only scheme) from the UE 130. The threshold distance is configured or preconfigured.

In some example embodiments, if the UE 110 determines that a resource is reserved by both the UE 120 and the UE 130 and that the control information from the UE 120 indicates that a partial sensing or no sensing is performed by the UE 120, the UE 110 may determine the resource collision status as presence of a potential resource collision.

Alternatively or in addition, if the UE 110 determines that a resource is reserved by both the UE 120 and the UE 130 and that the further control information from the UE 130 indicates that a partial sensing or no sensing is performed by the UE 130, the UE 110 may determine the resource collision status as presence of a potential resource collision.

In some example embodiments, if the UE 110 determines that a resource is reserved by both the UE 120 and the UE 130 and that the control information from the UE 120 indicates a periodic resource reservation performed by the UE 120, the UE 110 may determine the resource collision status as presence of a potential resource collision.

Alternatively or in addition, if the UE 110 determines that a resource is reserved by both the UE 120 and the UE 130 and that the further control information from the UE 130 indicates a periodic resource reservation performed by the UE 130, the UE 110 may determine the resource collision status as presence of a potential resource collision.

In some example embodiments, if the UE 110 determines that a potentially collided resource is reserved by both the UE 120 and the UE 130 and that the measured power of a signal from the UE 120 or the measured power of a signal from the UE 130 exceeds a power threshold, the UE 110 may determine the resource collision status as presence of a potential resource collision. For example, if the UE 110 determines that the measured RSRP from the UE 120 or the measured RSRP from the UE 130 exceeds the power threshold (or the RSRP threshold), the UE 110 may determine the resource collision status as presence of a potential resource collision.

In some example embodiments, the power threshold may be determined based on a priority of data to be transmitted using the potentially collided resource by the UE 120. The priority is indicated by the control information from the UE 120. Alternatively, the power threshold may be determined based on a priority of data to be transmitted using the potentially collided resource by the UE 130. The priority is indicated by the further control information from the UE 130.

In some example embodiments, if the UE 110 determines that a time gap between a collision detection and time of the potential resource collision exceeds a time threshold, the UE 110 may determine the resource collision status as presence of a potential resource collision. The time threshold is configured or preconfigured.

Alternatively or in addition, in some example embodiments, if the UE 110 is an intended receiver of the UE 120 or the UE 130, the UE 110 may determine the resource collision status as presence of a potential resource collision. For example, if the UE 110 is the intended receiver of the UE 120, a resource reserved by the UE 120 on a slot when the UE 110 does not expect to perform reception from the UE 120 due to half duplex constraints may be counted as a potentially collided resource and the UE 110 may determine the resource collision status as presence of a potential resource collision. In this way, it may prevent the UE 120 from SL transmission due to half duplex. It is to be understood that the UE 110 still may determine the resource collision status using further methods or additional conditions other than those mentioned above.

At block 730, the UE 110 transmits, via the transceiver of the UE 110 and to the UE 120, coordination information concerning a transmission to be performed by the UE 120. The coordination information indicates the resource collision status. For example, the coordination information may indicate that there is a potential resource collision. Otherwise, if at block 720, the UE 110 determines that the resource collision status as inexistence of a potential resource collision, the coordination information may indicate that there is no potential resource collision.

Additional criteria and details regarding the indication of a potential resource collision have been described with respect to FIG. 7 above. With these criteria or conditions, the UE 110 may better identify the potential resource collision. With the coordination information indicating the potential resource collision, the UE 120 may perform resource reselection to avoid the potential resource collision. In this way, the SL communications can be improved.

Several examples regarding determination of the resource collision status have been described above with respect to FIG. 7, as shown in FIG. 2B, with the coordination information received from the UE 110 indicating the resource collision status, the UE 120 determines 290 a resource reselection based on the coordination information. Details regarding determination of the resource reselection will be described with respect to FIG. 8 below.

Determination of a Resource Reselection

Conventionally, the UE-B may determine to perform resource reselection based on the coordination information received from the UE-A. However, it lacks detail conditions and methods regarding how to determine the performance of resource reselection for the UE-B.

Figure 8:
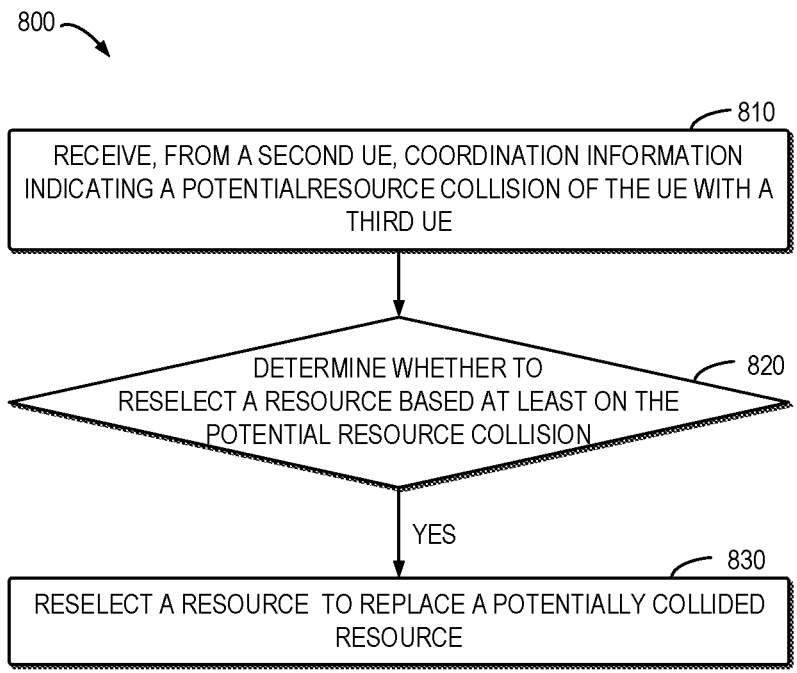
FIG. 8 illustrates a flowchart illustrating another example method of resource reselection based on coordination information according to some embodiments of the present disclosure.

FIG. 8 illustrates a flowchart illustrating an example method 800 of resource reselection determination based on coordination information according to some embodiments of the present disclosure. For the purpose of discussion, the method 800 will be described with reference to FIGS. 1 and 2B. The method 800 may be implemented at a UE-B, for example, the UE 120. For the purpose of discussion, the method 800 will be described from the perspective of the UE 120.

At block 810, the UE 120 receives, via a transceiver of the UE 120 and from the UE 110, coordination information concerning a transmission to be performed by the UE 120. The coordination information indicates a potential resource collision of the UE 120 with a further UE such as the UE 130 or with the UE 110. The coordination information may be determined using the method 700 described above or other suitable methods.

At block 820, the UE 120 determines whether to reselect a resource based at least on the potential resource collision. For example, the UE 120 may make the determination based on the potential resource collision and at least one condition. If the coordination information indicates the potential resource collision and at least one condition is met, the UE 120 may determine to reselect a resource. One condition may be that a time gap between reception time of the coordination information and time of the potential resource collision exceeds a time threshold. The time threshold is configured or preconfigured.

Another condition may be that the UE 120 performs a partial sensing or no sensing in its resource selection or reselection procedure. A further condition may be that the UE 110 is expected to receive data from the UE 120. That is, the UE 110 is one of the receiver(s) from the UE 120.

A further condition may be that the potentially collided resource is used to transmit a data block different from a data block associated with control information of the UE 120. For example, the indicated resource is for transmission of another transport block (TB). In other words, the indicated resource is for transmission of a TB different from the TB associated with the transmitted SCI.

A still further condition may be that the number of retransmissions of a data block to be transmitted using the potentially collided resource is above a threshold number. For example, the total number of retransmissions of a TB other than the potentially collided resources is more than 1. In this situation, the UE 120 may simply skip the transmission on the collided resource, and may not reselect any new resources. It is to be understood that the threshold number may be configured or preconfigured, and may be any suitable number, such as 1.

A still further condition may be that a delay limit for data transmission is smaller than a threshold. For example, if the remaining data PDB is smaller than a threshold, the condition is met. Several conditions have been described above, if at least one of the above conditions is met and the coordination information indicates a potential resource collision, the method 800 will proceed to block 830.

At block 830, the UE 120 reselects a resource to replace the potentially collided resource. For example, the UE 120 may reselect the resource subsequent to the potentially collided resource in time domain. In other words, the UE 120 may only reselect resources which are after the potentially collided resource(s).

With the coordination information indicating the potential resource collision, the UE 120 may perform resource reselection to avoid the potential resource collision. In this way, the SL communications can be improved.

It is to be understood that the above described methods 300-800 may perform separately, or perform in any suitable combinations. In this way, the SL communications can be improved.

Figure 9:
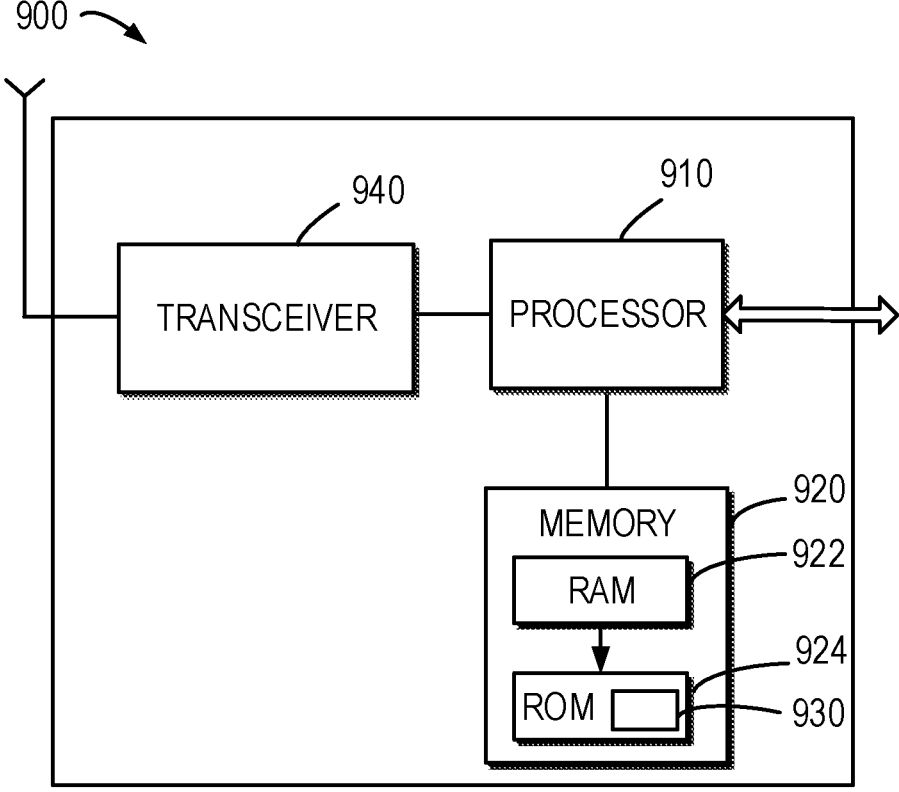
FIG. 9 illustrates a simplified block diagram of a device that is suitable for implementing embodiments of the present disclosure.

FIG. 9 is a simplified block diagram of a device 900 that is suitable for implementing embodiments of the present disclosure. For example, the UEs 110, 120 and 130 can be implemented by the device 900. As shown, the device 900 includes a processor 910, a memory 920 coupled to the processor 910, and a transceiver 940 coupled to the processor 910.

The transceiver 940 is for bidirectional communications. The transceiver 940 is coupled to at least one antenna to facilitate communication. The transceiver 940 can comprise a transmitter circuitry (e.g., associated with one or more transmit chains) and/or a receiver circuitry (e.g., associated with one or more receive chains). The transmitter circuitry and receiver circuitry can employ common circuit elements, distinct circuit elements, or a combination thereof.

The processor 910 may be of any type suitable to the local technical network and may include one or more of the following: general purpose computers, special purpose computers, microprocessors, digital signal processors (DSPs) and processors based on multicore processor architecture, as non-limiting examples. The device 900 may have multiple processors, such as an application specific integrated circuit chip that is slaved in time to a clock which synchronizes the main processor.

The memory 920 may include one or more non-volatile memories and one or more volatile memories. Examples of the non-volatile memories include, but are not limited to, a Read Only Memory (ROM) 924, an electrically program-mable read only memory (EPROM), a flash memory, a hard disk, a compact disc (CD), a digital video disk (DVD), and other magnetic storage and/or optical storage. Examples of the volatile memories include, but are not limited to, a random access memory (RAM) 922 and other volatile memories that will not last in the power-down duration.

A computer program 930 includes computer executable instructions that are executed by the associated processor 910. The program 930 may be stored in the ROM 1024. The processor 910 may perform any suitable actions and pro-cessing by loading the program 930 into the RAM 922.

The embodiments of the present disclosure may be imple-mented by means of the program 930 so that the device 900 may perform any method of the disclosure as discussed with reference to FIGS. 3-8. The embodiments of the present disclosure may also be implemented by hardware or by a combination of software and hardware.

The present disclosure also provides at least one computer program product tangibly stored on a non-transitory com-puter readable storage medium. The computer program product includes computer-executable instructions, such as those included in program modules, being executed in a device on a target real or virtual processor, to carry out the method 300 as described above with reference to FIG. 3 and/or the method 400 as described above with reference to FIG. 4 and/or the method 500 as described above with reference to FIG. 5 and/or the method 600 as described above with reference to FIG. 6 and/or the method 700 as described above with reference to FIG. 7 and/or the method 800 as described above with reference to FIG. 8.

Further, while operations are depicted in a particular order, this should not be understood as requiring that such operations be performed in the particular order shown or in sequential order, or that all illustrated operations be per-formed, to achieve desirable results. In certain circum-stances, multitasking and parallel processing may be advan-tageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. Conversely, various features that are described in the context of a single embodiment may also be implemented in mul-tiple embodiments separately or in any suitable sub-combi-nation.

Although the present disclosure has been described in languages specific to structural features and/or methodologi-cal acts, it is to be understood that the present disclosure defined in the appended claims is not necessarily limited to the specific features or acts described above. Rather, the specific features and acts described above are disclosed as example forms of implementing the claims.

What is claimed is:

1. A processor of a user equipment (UE) configured to perform operations comprising:
  determining that a time gap associated with a potential resource collision exceeds a time threshold; and in accordance with a determination that the time gap associated with the potential resource collision exceeds the time threshold, transmitting, via a transceiver of the UE and to a second UE, coordination information concerning a transmission to be performed by the second UE, the coordination information indicating the second UE to perform resource selection.

2. The processor of claim 1, wherein the coordination information indicates a resource set non-preferred for the UE without a resource set preferred for the UE.

3. The processor of claim 1, wherein the coordination information further indicates the potential resource collision.

4. The processor of claim 1, wherein the coordination information further indicates the potential resource collision and the data to be transmitted by a potentially collided resource.

5. The processor of claim 1, the operations further com-prising:
  receiving, from the second UE, sidelink control informa-tion (SCI).

6. The processor of claim 5, wherein the time gap asso-ciated with the potential resource collision comprises a time period between receiving the SCI from the second UE and the potential resource collision.

7. The processor of claim 1, the operations further com-prising:
  receiving, from a third UE, sidelink control information (SCI).

8. A method, comprising:
  at a user equipment (UE):
    determining that a time gap associated with a potential resource collision exceeds a time threshold; and
    in accordance with a determination that the time gap associated with the potential resource collision exceeds the time threshold, transmitting, via a trans-ceiver of the UE and to a second UE, coordination information concerning a transmission to be per-formed by the second UE, the coordination informa-tion indicating the second UE to perform resource selection.

9. The method of claim 8, wherein the coordination information indicates a resource set non-preferred for the UE without a resource set preferred for the UE.

10. The method of claim 8, wherein the coordination information further indicates the potential resource collision.

11. The method of claim 8, wherein the coordination information further indicates the potential resource collision and the data to be transmitted by a potentially collided resource.

12. The method of claim 8, the operations further com-prising:
  receiving, from the second UE, sidelink control informa-tion (SCI).

13. The method of claim 12, wherein the time gap associated with the potential resource collision comprises a time period between receiving the SCI from the second UE and the potential resource collision.

14. The method of claim 8, the operations further com-prising:
  receiving, from a third UE, sidelink control information (SCI).

15. An apparatus comprising processing circuitry coupled to memory, the processing circuitry configured to:
  determine that a time gap associated with a potential resource collision exceeds a time threshold; and
  in accordance with a determination that the time gap associated with the potential resource collision exceeds the time threshold, transmitting, via a transceiver of the UE and to a second UE, coordination information concerning a transmission to be performed by the second UE, the coordination information indicating the second UE to perform resource selection.

16. The apparatus of claim 15, wherein the coordination information indicates a resource set non-preferred for the UE without a resource set preferred for the UE.

17. The apparatus of claim 15, wherein the coordination information further indicates the potential resource collision.

18. The apparatus of claim 15, wherein the coordination information further indicates the potential resource collision and the data to be transmitted by a potentially collided resource.

19. The apparatus of claim 15, the processing circuitry further configured to:

process, based on signaling received from the second UE, sidelink control information (SCI).

20. The apparatus of claim 19, wherein the time gap associated with the potential resource collision comprises a time period between receiving the SCI from the second UE and the potential resource collision.

* * * * *